United States Patent Office 3,816,549
Patented June 11, 1974

3,816,549
PURIFICATION OF ALKYLENE GLYCOLS
Roy H. Prinz, Robstown, Tex., assignor to
Celanese Corporation, New York, N.Y.
No Drawing. Filed Jan. 28, 1971, Ser. No. 110,641
Int. Cl. C07c 31/20
U.S. Cl. 260—637 R                            7 Claims

ABSTRACT OF THE DISCLOSURE

Process for improving the taste and/or odor characteristics of a crude alkylene glycol by subjecting the glycol to dual solvent extraction wherein water and a dialkyl ether are the dual solvents, the impurities being preferentially dissolved in the ether phase while the purified glycol is preferentially dissolved in the water phase.

BACKGROUND OF THE INVENTION

In the production of alkylene glycols various impurities are produced which are difficult of removal and usually exist in small amounts in the final product even though normal purification steps have been taken to produce an alkylene glycol of commercial purity. Some of these impurities contribute to the odor and the taste of the glycol and although taste may not be important in many glycols, such as ethylene glycol, the odor of the finished product may be important depending on the final use thereof. Two of the lower alkylene glycols, 1,3-butylene glycol and 1,2-propylene glycol, find substantial use as food additives and, therefore, it is very important to eliminate from these glycols any impurities which contribute to odor or taste since in such food uses a tasteless, odorless product is desired. The taste and odor forming impurities of concern generally are present in very small amounts which account somewhat for their difficulty of removal. For example, these impurities would generally be present in a commercial purity grade of glycol in from about 10 to 1000 p.p.m. (parts per million by weight) and even amounts which are so low as to be undetectable by ordinary techniques will impart an undesirable taste and/or odor.

It has been found extremely difficult to accomplish removal of the odor and taste causing impurities through distillation because of the small amounts involved and also because of the fact that their boiling points are apparently extremely close to that of the alkylene glycol itself. The exact nature of the impurities is not known but it is generally felt that the impurities contributing to taste and odor are oxygenated hydrocarbons such as formals, esters, unsaturated aldehydes and the like. It is felt that some of these impurities are a result of a dehydration or partial dehydration of the glycol.

SUMMARY OF THE INVENTION

It is, thus, an object of the present invention to provide a method for improving the odor and/or taste characteristics of an alkylene glycol, particularly 1,3-butylene glycol or 1,2-propylene glycol. It is also an object of the present invention to provide a dual solvent extration system for removal, from alkylene glycols, impurities which contribute to the odor and taste thereof. Additional objects will become apparent from the following description of the present invention.

These and other objects may be accomplished by the present invention which in one of its aspects is a dual solvent extraction process for the removal of impurities which contribute to the odor and taste of a crude lower alkylene glycol containing same, which process comprises: (a) Intimately contacting said crude alkylene glycol in liquid form with both phases of a liquid dual solvent system, one phase of said dual solvent system consisting essentially of water and the other phase consisting essentially of a dialkyl ether wherein the alkyl groups thereof contain from 1 to 6 carbon atoms, whereby the impurities contributing to odor and taste in said glycol are preferentially dissolved into the ether phase of said dual solvent system and said alkylene glycol is preferentially dissolved into the water phase of said dual solvent system, (b) separating said ether phase containing said impurities from said water phase containing said alkylene glycol, and (c) treating the thus separated water phase to isolate the alkylene glycol contained therein, the thus isolated alkylene glycol containing less of said impurities than said crude alkylene glycol.

DETAILED DESCRIPTION OF THE INVENTION

The present invention relates to the use of a dual solvent extraction system for treating a crude alkylene glycol. The use of dual solvent extraction systems for purification of various compounds is well-known and may be accomplished in a variety of manners. In general, these dual solvent systems merely involve the intimate contact of an impure material with both phases of the dual solvent system, which phases are immiscible, such that the impurities are preferentially dissolved in one of the phases and the material being purified is dissolved in the other phase. The material being purified is then recovered from solution in its particular phase with the recovered product containing less impurities than the crude material. Any of the known methods for accomplishing a dual solvent extraction may be utilized to carry out the present invention. For example, mixer-settlers may be used where the crude glycol is merely added to a vessel containing both solvent phases of the dual solvent system and then the mixture agitated vigorously to accomplish intimate contact of the crude glycol with each of the two solvent phases. As pointed out above, in a dual solvent system the two solvent phases are immiscible such that a vigorous agitation is generally required to insure proper contact of the glycol with both phases. After sufficient mixing, the phases are allowed to layer or settle out through gravity or through the use of a centrifuge.

Particularly if a continuous process is to be utilized, the dual solvent extraction is preferably accomplished in some sort of vertical tower which generally contains packing, baffles or trays in order to increase efficiency. In using such towers the crude glycol will be fed to the tower at a midpoint thereof while the heavy phase of the dual solvent system (in this invention water) will be fed to an upper point in the column and above the crude glycol feed point. The lighter phase of the dual solvent system will be fed to a lower point in the tower and below the crude glycol feed point. By force of gravity the lighter phase will migrate upwardly preferentially dissolving, in the case of the present invention, the impurities and will be removed overhead. The heavier phase will migrate downwardly through the tower dissolving, in the case of the present invention, the alkylene glycol and be removed as bottoms from the tower. The bottoms will then be treated such as by distillation for isolation of the purified glycol.

Generally the overhead would be sent to a solvent recovery zone for removal of impurities from the lighter phase so that the lighter solvent could be recycled to the extraction column.

In the present invention the heavy phase of the dual solvent system is water while the light phase is a dialkyl ether. The dialkyl ethers that may be utilized are those wherein each alkyl group thereof contains from 1 to 6 carbon atoms and are generally of the formula $$R_1—O—R_2 \qquad I$$

wherein in $R_1$ and $R_2$ may be alike or different and are alkyl groups of 1 to 6 carbon atoms, preferably 2 to 4 carbon atoms. Diethyl ether is the especially preferred ether for use in present invention. Other ethers that may be used include dipropyl ether, diisopropyl ether, ethyl n-propyl ether, methyl isobutyl ether, ethyl *sec*-butyl ether, and methyl *tert*-butyl ether.

The lower alkyleneglycols which may be purified in accordance with the present invention are those unsubstituted alkylene glycols containing 2 to 6 carbon atoms wherein the hydroxyl groups thereof are on different carbon atoms. "Glycol" as used herein is meant to include those compounds containing two and only two hydroxyl groups. Structurally the glycols which may be purified are those containing 2 to 6 carbon atoms and being of the structural formula $$\begin{array}{c} R_3 \\ | \\ HO—C—R_5—OH \\ | \\ R_4 \end{array} \qquad II$$

wherein $R_3$ and $R_4$ may be hydrogen or alkyl groups and $R_5$ is a saturated divalent hydrocarbon radical. The present invention is particularly suitable for treating 1,2-propylene glycol and 1,3-butylene glycol, especially the latter. Other glycols which may be treated include 1,2-butylene glycol, 1,4-butylene glycol, 2,4-pentanediol, 1,3-propylene glycol, 1,6-hexanediol and ethylene glycol as well as some glycol ethers such as diethylene glycol and tripropylene glycol.

Although the term "crude" is used to describe the alkylene glycols to be purified in accordance with the present invention it should be understood that they do not necessarily contain large amounts of impurities and may be of sufficient purity to use in most commercial applications. In fact, the present invention will normally be applied to a glycol which has already undergone normal purification operations and is of at least 97 wt. percent and usually at least 98 wt. percent purity, but which for the present invention will be called a crude glycol since it still has odor and taste causing impurities therein.

Even though the crude glycol may contain two percent or so of impurities, all of these will generally not be of the type contributing to odor and taste, and usually the odor or taste contributing impurities of concern and which are removed by the invention will be present in amounts of from about 10 to 5,000 p.p.m. As pointed out above, the exact nature of these impurities is not known but they are felt to mainly be unsaturated oxygenated compounds resulting from the dehydration of the glycol although other types of impurities arising in the course of manufacture and storage of the glycol also contribute to the odor and taste. The present invention is particularly suitable for treating 1,3-butylene glycol which has been prepared by hydrogenating 3-hydroxybutanal.

The ether phase of the dual solvent system should generally be present in from about 2 to 6 parts by volume per each one part by volume of the crude alkylene glycol although larger or smaller amounts of ether can be utilized effectively. Preferably the ether phase of the dual solvent system is present in from about 2 to 4 parts per part by volume of the alkylene glycol. On the other hand, the water phase of the dual solvent system should generally be present in amounts of from about 0.5 to 5.0 parts, preferably 0.8 to 2.0 parts, by volume per part by volume of the crude alkylene glycol.

The temperature at which the crude glycol and the solvent system are mixed may be ordinary temperatures; for example, within the range of about 5° C. to 100° C. but preferably within the range of 15° C to 80° C. Although the temperature can be above the normal boiling point of the mixture such is generally economically unfeasible as it would require the use of super-atmospheric pressures to maintain a liquid phase. The pressure needs only to be sufficient to maintain a liquid phase and may be sub-atmospheric, atmospheric or super-atmospheric.

After the dual solvent extraction treatment of the crude glycol is completed it will be necessary to isolate the purified glycol from the water phase. This isolation may be accomplished by any of the known methods, the most economical method generally being distillation. It is pointed out that in addition to the water and glycol, there will usually be present in the water phase removed from the extraction zone small amounts, for example 5 to 12 wt. percent of the ether used. The reason for this is that the ether is slightly soluble in the water. No problems, however, are encountered in removing the ether as it distills overhead followed by the water. In a continuous process where the solvents are to be removed and recycled to the extraction zone it is most convenient to send the glycol-containing water phase removed from the extraction zone to a first column where the residual ether is removed overhead and recycled; and then the bottoms of the ether removal column sent to a dehydrator column where the water is removed overhead and recycled. The glycol product improved as to odor and taste is then removed from the bottom of the second column, that is, the dehydrator column, and may be subjected to additional distillation or other purification techniques if desired.

The following example illustrates a particular embodiment of the present invention but is not to be taken as limiting the scope thereof.

EXAMPLE

In the laboratory a glass column one inch in diameter and eight feet long was modified so as to accomplish a dual solvent purification of crude 1,3-butylene glycol prepared by hydrogenating 3-hydroxybutanal which had been produced the condensation of acetaldehyde in the presence of an alkaline catalyst. An inlet point for the crude 1,3-butylene glycol was placed about four feet from the bottom of the glass column, an inlet for a diethyl ether stream provided about three inches from the bottom of the column and an inlet for water provided about three inches from the top of the column. The bottom of the glass column itself was adapted for removal of the water phase and the top of the column fitted for removal of the ether phase. Finally, the column was packed with ¼ inch beryl saddles and the operations begun for purifying the crude 1,3-butylene glycol having undesirable taste and odor characteristics. The "crude" butylene glycol was of 98 plus weight percent purity. The crude 1,3-butylene glycol, diethyl and water were fed continuously to the column at the points referred to above, the volume ratio of water to crude glycol being 1:1 and the volume ratio of diethyl ether to crude glycol being 3:1. During the operations the feed streams as well as the column were maintained at about 25° C. Upon removal of the water phase from the bottom of the column it was passed to a 20 tray solvent recovery distillation column operated at a 3:1 reflux ratio and in which the residual ether was distilled overhead and removed. The bottoms from the solvent recovery column were passed to a 30 tray dehydrator column operated at a 3:1 reflux ratio wherein the water present was removed overhead, the bottoms from the dehydrator column being the purified 1,3-butylene glycol product. A panel of five persons rated both the crude 1,3-butylene glycol and the thus purified 1,3-butylene glycol as to smell and taste. The panel reported the crude glycol to be "very bitter" in taste and the purified glycol to be "mild" in taste. The panel adjudged the purified glycol to have an odor of 0.7 as compared to a higher odor of about 1.2 to 1.5 for the crude glycol, on a scale wherein no odor is given a rating of zero (0) and a standard sample of U.S.P. propylene glycol is given a rating of 0.6.

The embodiments of the invention in which an exclusive property or privilege is claimed are defined as follows:

1. A dual solvent extraction process for the improvement of the odor and taste characteristics of a crude 1,3-butylene glycol, which process comprises:
   (a) Intimately contacting at a temperature of about 15° C. to 80° C. said crude glycol in liquid form with both phases of a liquid dual solvent system, one phase of said dual solvent system consisting essentially of water and the other phase consisting essentially of a dialkyl ether wherein the alkyl groups thereof contain from 2 to 4 carbon atoms, there being about 0.8 to 2.0 parts by volume of water in said dual solvent system per part of said crude glycol and from about 2 to 4 parts by volume of ether in said dual solvent system per part of crude glycol, whereby the impurities contributing to odor and taste in said glycol are preferentially dissolved into the ether phase of said dual solvent system and said glycol is preferentially dissolved into the water phase of said dual solvent system,
   (b) separating said ether phase containing said impurities from said water phase containing said glycol, and
   (c) treating the thus separated water phase to isolate the 1,3-butylene glycol containing less of said impurities than said crude glycol.

2. The process of claim 1 wherein said ether is diethyl ether.

3. The process of claim 1 wherein said impurities include unsaturated oxygenated hydrocarbons.

4. The process of claim 1 wherein in step (c) thereof said glycol is isolated by distillation.

5. The process of claim 1 wherein said 1,3-butylene glycol is of at least 97 percent purity and has been produced by hydrogenating 3-hydroxybutanal.

6. The process of claim 1 wherein the process is continuous and steps (a) and (b) thereof are accomplished in a vertical tower, the crude glycol being fed to a midpoint in said tower, the water phase of said dual solvent system being fed at an upper point in said tower, the ether phase of said dual solvent system being fed to a lower point in said tower, said water phase containing 1,3-butylene glycol dissolved therein is removed as bottoms from tower and the ether phase containing said impurities is removed as the overhead from said tower.

7. The process of claim 6 wherein said impurities are present in amounts of about 10 to 5,000 p.p.m. and include unsaturated oxygenated hydrocarbons, wherein said crude 1,3-butylene glycol is of at least 97 percent purity and has been produced by hydrogenating 3-hydroxybutanal and wherein the purified 1,3-butylene glycol is isolated in step (c) thereof by distillation.

References Cited

UNITED STATES PATENTS

| | | | |
|---|---|---|---|
| 3,586,716 | 6/1971 | Yasui et al. | 260—637 R |
| 3,489,655 | 1/1970 | Peveto et al. | 260—637 R |
| 2,358,212 | 9/1944 | Christensen | 260—637 R |
| 3,542,857 | 11/1970 | Lutz | 260—497 R |
| 3,479,395 | 11/1969 | Huguet | 260—497 R |

JOSEPH E. EVANS, Primary Examiner

U.S. Cl. X.R.

260—615 R, 615 B